C. L. STANCLIFF.
PISTON.
APPLICATION FILED MAR. 5, 1918.
1,320,428. Patented Nov. 4, 1919.
2 SHEETS—SHEET 2.
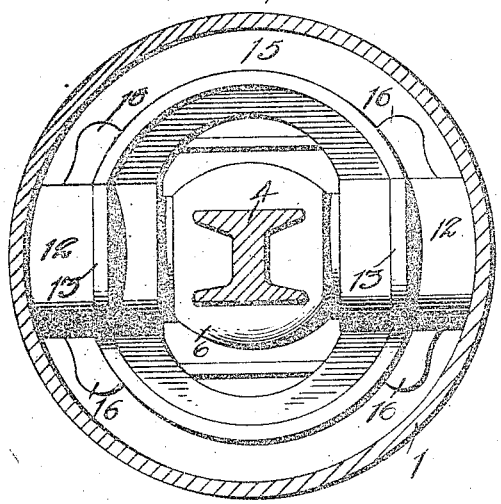
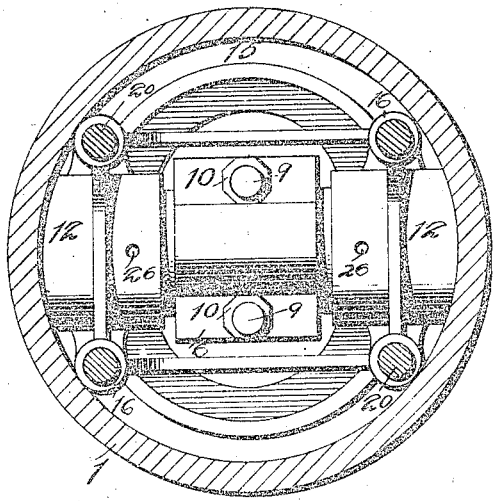
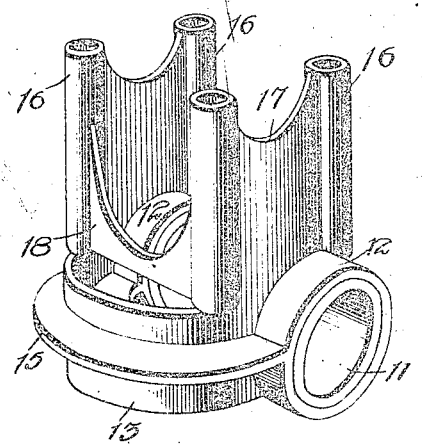
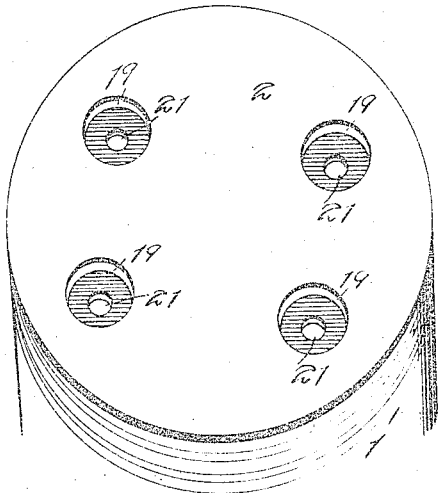
WITNESSES
George G. Myers.
INVENTOR
CLIFTON L. STANCLIFF,
BY
ATTORNEYS

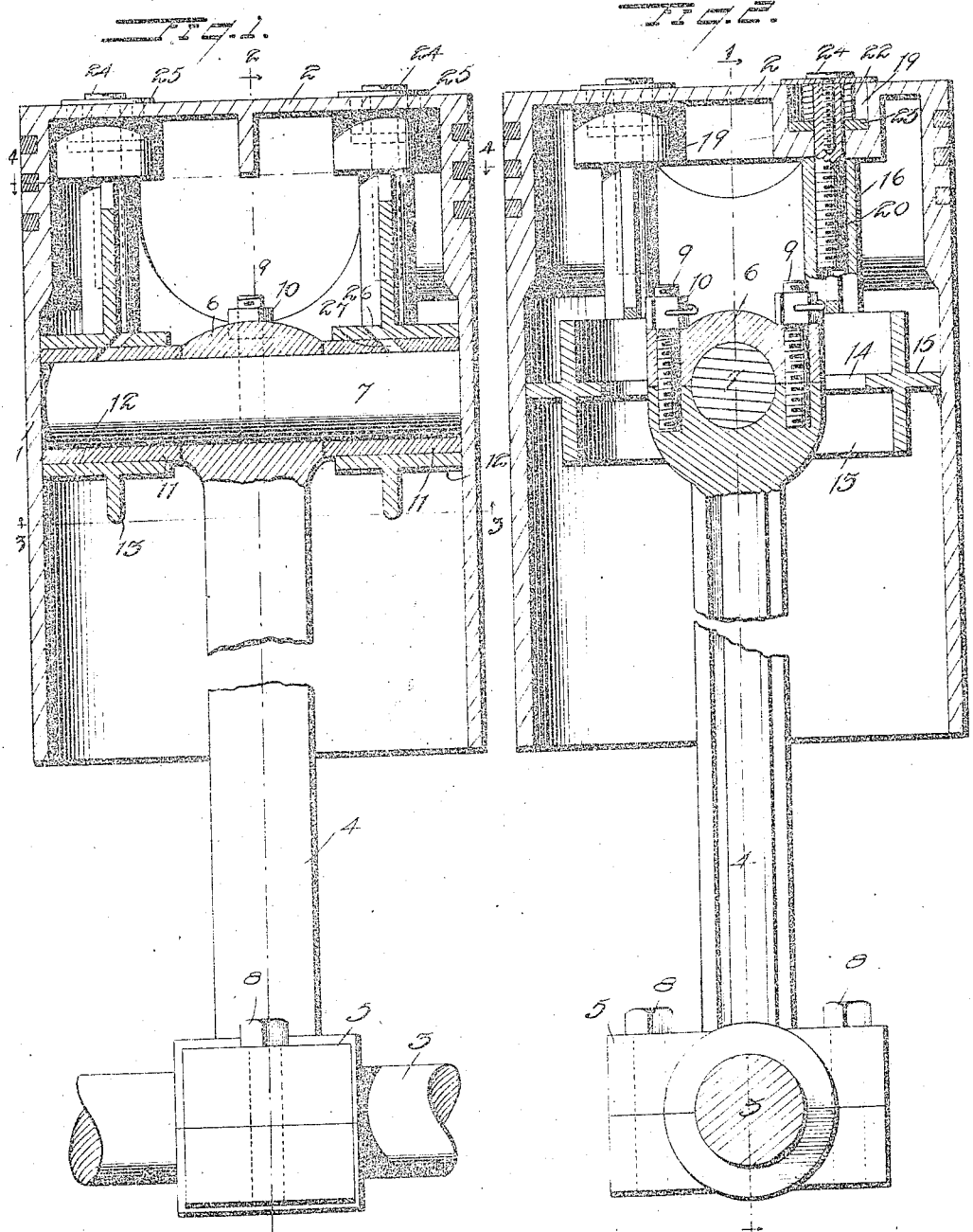

UNITED STATES PATENT OFFICE.

CLIFTON LLEWELLYN STANCLIFF, OF BAKERSFIELD, CALIFORNIA.

PISTON.

1,320,428.   Specification of Letters Patent.   Patented Nov. 4, 1919.

Application filed March 5, 1918.   Serial No. 220,543.

*To all whom it may concern:*

Be it known that I, CLIFTON L. STANCLIFF, a citizen of the United States, and a resident of Bakersfield, in the county of Kern and State of California, have invented certain new and useful Improvements in Pistons, of which the following is a specification.

My invention is an improvement in pistons, and has for its object to provide a detachable connection between the piston and the piston rod, by means of which a new piston can be fitted to the cylinder without disassembling the motor, or loose bearings, and like troubles may be remedied from the top of the piston, and wherein the piston grooves and rings may be cleaned from carbon without removing the piston from the cylinder.

In the drawings:

Figure 1 is a section on the line 1—1 of Fig. 2;

Figs. 2, 3 and 4 are sections on the lines 2—2, 3—3 and 4—4, respectively, of Fig. 1, Figs. 3 and 4 looking in the direction of the arrows adjacent the line;

Fig. 5 is a perspective view of the cage for the wrist pin; and

Fig. 6 is a perspective view of the outer end of the cylinder.

In the present embodiment of the invention, the cylinder 1, which is of the usual cup shape, having its outer end closed, as indicated at 2, and its inner end open, is connected to the crank shaft 3 by the piston rod 4, the said rod having a sectional bearing 5 for engaging the crank shaft and a sectional bearing 6 for engaging the wrist pin 7.

The sections of the bearing 5 are secured together by means of the usual screw bolts 8, and the sections of the bearings 6 are secured together by threaded stems 9 which extend from the inner section of the bearing which is integral with the piston rod through openings in the outer section of the bearing, and the said stems are engaged by nuts 10 which are locked on the stems, as shown.

Each end of the wrist pin 7 engages within a bushing 11 in a bearing sleeve 12 in the cage, the said cage consisting, as shown more particularly in Figs. 2, 3, 4 and 5, of a cylindrical or ring shaped body 13 of less diameter than the piston and having inwardly and outwardly extending reinforcing webs 14 and 15 at its longitudinal center. Four sockets 16 extend from the cage longitudinally of the piston, each of the sockets being internally threaded as shown in Fig. 2, and the said sockets are connected and reinforced by webs 17 and 18, the webs 17 extending transversely of the bearings 12 while the webs 18 extend longitudinally thereof. The outer ends of these sockets 16 are adapted to abut the inner ends of cylindrical depressions 19, the said depressions forming cup shaped openings 19 at the closed or outer end of the piston.

A threaded stem 20 is held in each socket, and these stems, which extend beyond the ends of the sockets, pass through openings 21 in the bottoms of the depressions and into the openings 19. Here they are engaged by nuts 22, a washer 23 being arranged beneath each nut. Each stem 20 has an internally threaded bore at its outer end, for engagement by a lock screw 24. Washers 25 are arranged beneath the heads of the lock screws 24 and the said washers are of a size to cover the openings 19, as shown more particularly at the right of Fig. 2. It will be noticed that the bearing sleeves 12 and the bushings 11 have registering openings 26 and 27, respectively, which permit oil to pass from the interior of the piston to the ends of the wrist pin 7, so that the said pin is thoroughly lubricated.

With the improved piston, whenever it is necessary for any reason to detach the piston from the piston rod it is only necessary to release the screws 24, after which the nuts 22 may be disengaged from the stems 20, and the piston is released from the cage and the piston rod.

In order to remove the piston and replace it with a new piston, or to remove and replace the old piston, it is not necessary to disassemble the motor, since the piston may be detached from its outer end and while still in place in the cylinder. Since the openings 19 are spaced at equal distances apart from each other and are similarly arranged with respect to the piston the piston may be given a quarter turn whenever desired, thus making the wear on the same more uniform and lengthening the life of the same. Furthermore, the pistons can be cast or molded without cores, thus decreasing the first cost of the same, and they can be made lighter than the usual piston, because the cage may be made from aluminum or pressed steel or cast iron.

If the bearings are worn out they can be replaced and if the wrist pin is worn it can be replaced without disassembling motor, and a new piston can be inserted without disassembling motor.

I claim:

1. In combination with the piston, the piston rod, and the wrist pin, of a detachable connection between the said pin and the piston, said connection comprising a cage fitting within the piston and having alined bearing sleeves for the ends of the pin, and sockets extending from the cage, said sockets being arranged in pairs, the members of each pair being on opposite sides of the adjacent bearing sleeve, a threaded stem extending beyond the end of each socket, the piston having at the closed end thereof countersunk openings through which the stems extend, nuts engaging the stems within the countersunk portions of the openings, a washer closing each of the countersunk openings at the end of the piston, and a screw engaging each stem to hold the washer in place.

2. In combination with the piston, the piston rod, and the wrist pin, of a detachable connection between the said pin and the piston, said connection comprising a cage fitting within the piston and having alined bearing sleeves for the ends of the pin, and sockets extending from the cage, said sockets being arranged in pairs, the members of each pair being on opposite sides of the adjacent bearing sleeve, each socket having a threaded stem extending beyond the end of the socket, the piston having at the closed end thereof countersunk openings through which the stems extend, and nuts engaging the stems within the countersunk portions of the openings.

3. In combination with the piston, the piston rod and the wrist pin, of a detachable connection between the said pin and the piston, said connection comprising a cage fitting within the piston and having alined bearing sleeves for the ends of the pin, and threaded stems connected with the cage and extending longitudinally of the piston, said piston having openings at its closed end for receiving the stems, and nuts engaging the stems, the openings being countersunk to receive the nuts.

4. In combination with the piston, the piston rod and the wrist pin, of a detachable connection between the said pin and the piston, said connection comprising a cage fitting within the piston and having alined bearing sleeves for the ends of the pin, and threaded stems connected with the cage and extending longitudinally of the piston, said piston having openings at its closed end for receiving the stems, and nuts engaging the stems.

CLIFTON LLEWELLYN STANCLIFF.